US007100452B2

(12) United States Patent
Marsh

(10) Patent No.: US 7,100,452 B2
(45) Date of Patent: Sep. 5, 2006

(54) SURFACE ACOUSTIC WAVE MULTIPLE SENSE ELEMENT

(75) Inventor: Brian J. Marsh, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/016,165

(22) Filed: Dec. 15, 2004

(65) Prior Publication Data

US 2006/0123913 A1   Jun. 15, 2006

(51) Int. Cl.
 *G01L 11/06* (2006.01)
 *H01L 41/04* (2006.01)

(52) U.S. Cl. .................. 73/703; 73/702; 310/313 B

(58) Field of Classification Search ............... None
 See application file for complete search history.

(56) References Cited

U.S. PATENT DOCUMENTS

| | | | |
|---|---|---|---|
| 4,216,401 A | 8/1980 | Wagnet | 310/313 R |
| 4,317,372 A * | 3/1982 | Hartemann | 73/703 |
| 4,454,440 A | 6/1984 | Cullen | 310/313 R |
| 5,117,146 A | 5/1992 | Martin et al. | 310/313 R |
| 5,289,073 A | 2/1994 | Mariani | 310/313 D |
| 5,289,160 A * | 2/1994 | Fiorletta | 340/447 |
| 5,661,651 A | 8/1997 | Geschke et al. | |
| 5,874,679 A | 2/1999 | Sokn | 73/706 |
| 5,996,419 A | 12/1999 | Sokn | 73/706 |
| 6,520,020 B1 | 2/2003 | Lutz et al. | 73/706 |
| 6,571,638 B1 | 6/2003 | Hines et al. | 73/702 |
| 6,684,058 B1* | 1/2004 | Karacaoglu et al. | 455/20 |
| 2002/0078757 A1 | 6/2002 | Hines et al. | |
| 2002/0199210 A1* | 12/2002 | Shi et al. | 725/144 |
| 2004/0135675 A1* | 7/2004 | Thiesen et al. | 340/10.1 |

FOREIGN PATENT DOCUMENTS

| | | | |
|---|---|---|---|
| GB | 2355801 A | * | 5/2001 |
| GB | 2386684 A | * | 9/2003 |
| WO | WO 97/38290 | | 4/1997 |
| WO | WO 03/019461 A | | 3/2003 |
| WO | WO 03/019461 | * | 3/2005 |

OTHER PUBLICATIONS

Buff et al., Universal Pressure and Temperature SAW Sensor for Wireless Applications, IEEE Ultrasonics Symposium 1997, Oct. 5, 1997, p. 359-362.

* cited by examiner

*Primary Examiner*—Hezron Williams
*Assistant Examiner*—Rose M. Miller
(74) *Attorney, Agent, or Firm*—Kermit D. Lopez; Luis M. Ortiz

(57) ABSTRACT

A wireless sensor is disclosed, which includes a substrate upon which the wireless sensor can be configured. The wireless sensor includes a plurality of surface acoustic wave (SAW) sensing elements configured in parallel with one another upon the substrate, wherein one or more of the SAW sensing elements is responsive to a wireless frequency range that differs from that of a wireless frequency range of at least one other SAW sensing element among the group of SAW sensing elements. It is this parallelism that permits all of the SAW sensing elements to receive the same strain when pressure is applied thereon. In doing so, the capability for three separate interrogators to measure strain is provided. At any one location, however, only one style of interrogators can be employed, rendering two of the three SAW sensing elements useless, without interfering with the one SAW sensing element that is useful in order to permit a wireless interrogation of the wireless sensor despite varying international frequency standards thereof.

20 Claims, 3 Drawing Sheets

SURFACE ACOUSTIC WAVE MULTIPLE SENSE ELEMENT

TECHNICAL FIELD

Embodiments are generally related to sensor devices, methods and systems. Embodiments are also related to sensing devices and systems employing surface acoustic wave (SAW) components, a method of use thereof, and a manufacturing method therefor. Additionally, embodiments relate to wirelessly interrogable sensing methods and systems. Embodiments are further related to pressure sensors.

BACKGROUND OF THE INVENTION

In recent years, surface-launched acoustic wave sensors, and specifically surface acoustic wave (SAW) sensors, have gained significant recognition as tools for measuring physical and chemical parameters in a wide variety of applications. SAW sensor technology offers the following general advantages: passive device operation (no battery); potential for use as a sensor and an RF transmitter when queried, providing wireless operation; small size, low cost, rugged construction, and ease of production in high volume using standard process equipment. Some of the physical parameters measured using SAW sensors include temperature, pressure, strain, acceleration, and torque. Numerous potential applications have been mentioned in the literature for such sensors, one of which is the measurement of the pressure and/or temperature within tires.

One of the problems with conventional SAW sensors is that there are multiple international and national government regulations governing the use of radio frequencies with regard to interrogating a wireless sensor, such as a SAW sensor. Because regulations are different throughout the world, sensor suppliers are forced to manufacture multiple sensors that perform the same function but differ by the method or frequency in which the sensor is measured in order to accommodate all the applications worldwide. The embodiments disclosed herein address this problem by providing a configuration in which multiple sensing elements are placed on a single sensor so that the same product can be utilized internationally.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide for improved sensor devices, methods and systems.

It is another aspect of the present invention to provide for improved sensing devices and systems employing surface acoustic wave (SAW) components, such as SAW resonators.

It is yet another aspect of the present invention to provide for a parallel arrangement of SAW resonators on a substrate in the context of a sensor apparatus.

It is still a further aspect of the present invention to provide for wirelessly interrogable sensing methods and systems.

It is also an aspect of the present invention to provide for multiple sensing elements, such as SAW resonators, which are located and/or integrated on one sensor apparatus so that the same product can be utilized internationally, regardless of varying national and international frequency and wireless regulations.

The aforementioned aspects of the invention and other objectives and advantages can now be achieved as described herein. A wireless sensor is disclosed herein, which includes a substrate upon which the wireless sensor can be configured. The wireless sensor includes a plurality of surface acoustic wave sensing elements configured upon the substrate, wherein one or more of the plurality of surface acoustic wave sensing elements is responsive to a wireless frequency range that differs from that of a wireless frequency range of at least one other surface acoustic wave sensing elements among the plurality of surface acoustic wave sensing elements in order to permit a wireless interrogation of the wireless sensor despite varying international frequency standards thereof.

Each of the surface acoustic wave sensing elements can be located in parallel with one another upon the substrate. At least one of the plurality of surface acoustic wave sensing elements may comprise a surface acoustic wave resonator. The wireless sensor can function as a pressure sensor functioning in a delay mode, such that the plurality of surface acoustic wave sensing elements detects pressure based on a strain applied to the plurality of surface acoustic wave sensing elements. Each of the plurality of surface acoustic wave sensing elements receives an equivalent amount of strain when pressure is applied to the plurality of surface acoustic wave sensing elements.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment and are not intended to limit the scope of the invention.

Embodiments are related to multiple sensing elements, such as SAW resonators, which can be implemented on one sensor apparatus so that the same product can be utilized internationally, regardless of varying national and international frequency and wireless regulations.

Figure 1:
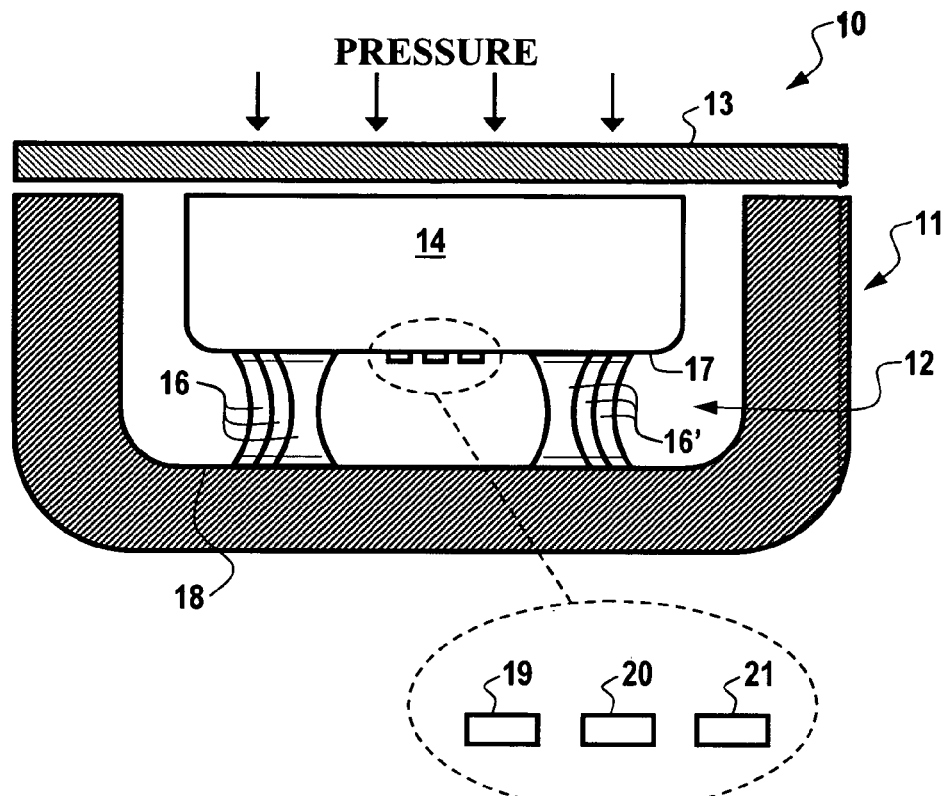
FIG. 1 illustrates a side cross-sectional view of a sensor apparatus, including sensor package and content, which can be implemented, in accordance with one embodiment.

FIG. 1 illustrates a side cross-sectional view of a sensor apparatus 10, which can be implemented in accordance with one embodiment. As indicated a FIG. 1, sensor apparatus 10 can function as a pressure and/or temperature sensor, and may be implemented within the interior of a vehicle tire. The sensor apparatus 10 comprises a substantially hermetically sealed insulating package. The package can be configured as a ceramic box 11 having a well 12 therein and a lid 13 sealingly affixed to the box 11 to cover the well 12. The box 11 may comprise, for example, a standard ceramic package such as is available for SAW devices for wireless communication products. These packages are small, rugged, inexpensive, and widely used.

The lid 13 can be configured as a thin, membranous metal cover, preferably steel or Kovar, although other materials can be used, having a thickness of approximately 2 mils, although these details are not intended to be limiting. The thickness of the lid 13 should be thin in order to transmit pressure changes to the sensor elements within the well 12. In one embodiment, the lid 13 can be soldered to the box 11, although alternative package sealing techniques, including seam welding, can also be used.

A substrate 14 can be supported within the well 12, the substrate having a thickness substantially greater than the lid's thickness. The substrate 14 can be implemented as a substantially planar piezoelectric quartz crystalline material, or die, depending upon design considerations.

The substrate 14 can be supported by one or more, but preferably two discrete stands, and preferably two rows of discrete stands, positioned in supporting relation to the substrate 14. Preferably at least some of the stands can comprise a gold stand 16, also known as a "bump bond," extending between the substrate's bottom 17 and a bottom 18 of the well 12. The gold stands 16 can also serve as electrical connectors. Other bump bonds 16' may provide only mechanical support and not electrical connection. The bump bonds 16' may be in contact with a region of the package that is not gold and thus may not attach firmly. In this case the bump bonds 16' act as spacers between the die 14 and the box 11.

One or more SAW resonators 19–21 can be affixed to the bottom 17 of the substrate 14, depending upon design considerations. The SAW resonators 19–21 can be configured as one-port resonators having slightly different nominal frequencies. For example, although not shown in FIG. 1, SAW resonators 19–21 can be arranged parallel, such as the parallel arrangement depicted in FIGS. 5–6 herein.

Figure 2:
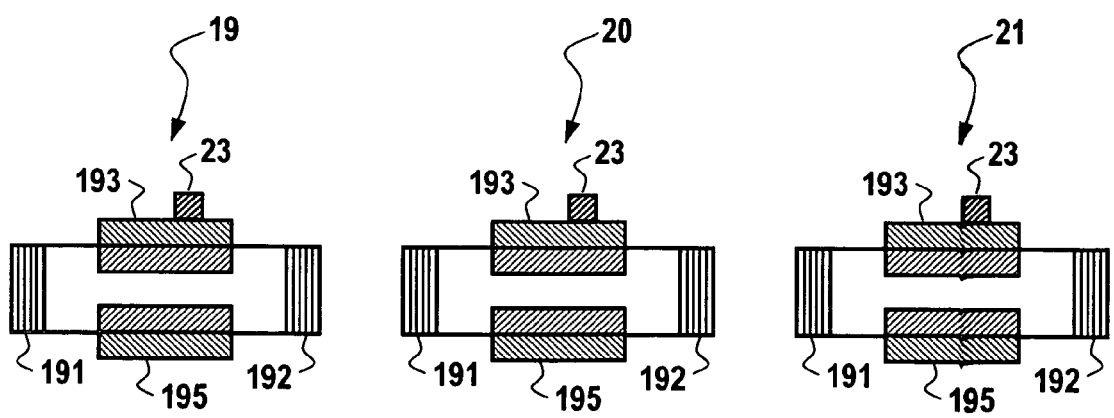
FIG. 2 illustrates a detailed view of the SAW resonators illustrated in FIG. 1, in accordance with one embodiment.
Figure 3:
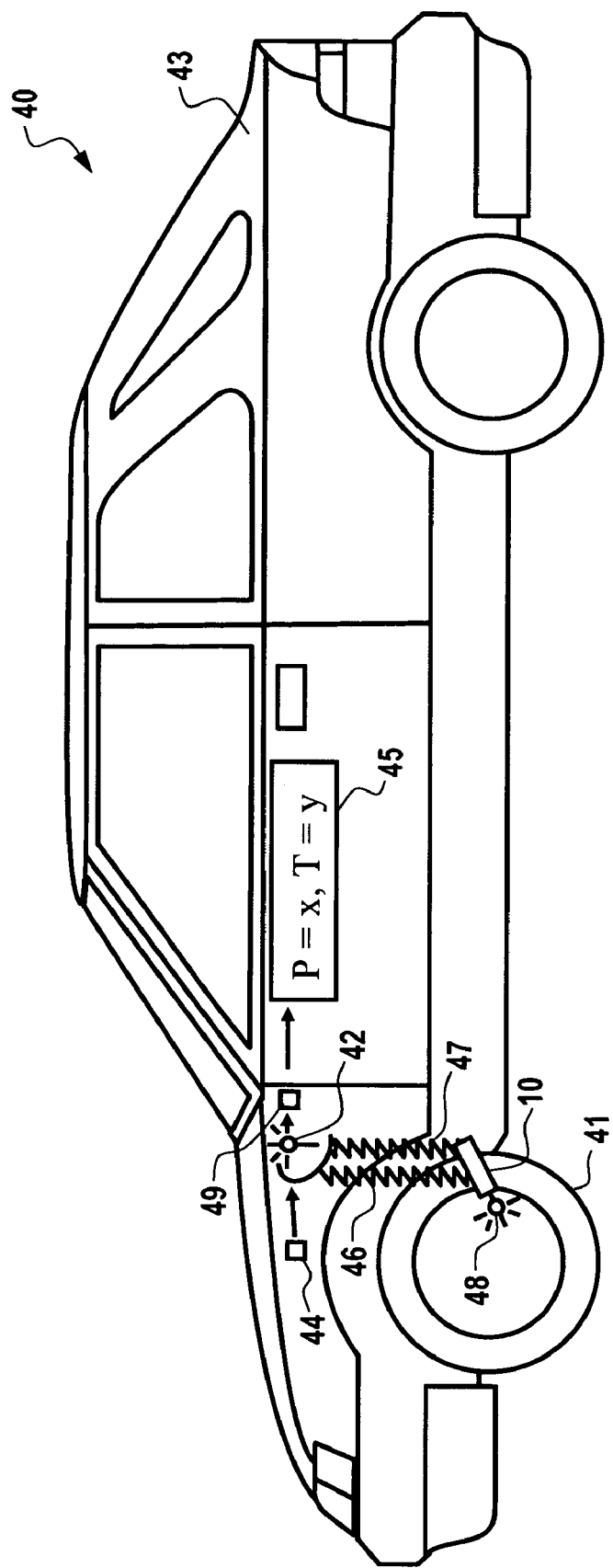
FIG. 3 illustrates a schematic diagram of a sensor system, which can be implemented in accordance with an alternative embodiment.

FIG. 2 illustrates a detailed view of the SAW resonators 19, 20, 21 illustrated in FIG. 1, in accordance with one embodiment. In FIGS. 1–3, identical or similar parts are generally indicated by identical reference numerals. As indicated in FIG. 2, Each SAW resonator 19–21 can comprise a pair of reflectors 191,192 and a transducer 193, 195 positioned therebetween. The SAW resonators 19–21 can be implemented to function strictly as pressure sensing SAW resonators 19–21, if desired. In such a circumstance, the SAW resonators 19–21 preferably functions in a delay mode. The SAW resonators 19–21 are arranged parallel to one another.

It is important to note that the particular design of SAW resonators 19–21 is not a limiting feature of the invention. For example, an alternative embodiment may be implemented without reflectors 191, 192, or additional reflectors. Also, the shape of SAW resonators 19–21 may vary. In FIGS. 1–2, SAW resonators 19–21 are illustrated in rectangular shapes. In alternative embodiments, however, SAW resonators 19–21 may be implemented in circular or oval shaped arrangements. Similarly, the width of substrate 14 can vary along with the shape of lid 13, and so forth.

Because there are multiple and varying national and international regulations governing the use of radio frequencies with regard to interrogating a wireless sensor, as indicated earlier, sensor suppliers and manufacturers are forced to manufacture multiple sensors that perform the same function but differ by the method of frequency in which the sensor is measured to accommodate all the applications worldwide. In accordance with a preferred embodiment, multiple sensing elements can be placed on sensor apparatus 10 so that the same product can be used internationally. The pressure sensor 10 utilizes two aspects of SAW resonators.

Multiple SAW resonators should be preferably located in parallel without interfering with each other, and each SAW resonator will change if strain is applied to it. Thus, SAW resonators 19–21 can be placed in parallel with one another in such a manner that all three SAW resonator components receive the same strain when pressure is applied. In doing so, pressure sensor 10 can provide the capability for three separate interrogators to measure the strain. At any one location, however, only one style of interrogators will be employed, rendering two of the three SAW resonators 19–21 useless, but not interfering with the one useful responsive resonator.

Depending upon design considerations, SAW resonators 19,20 may experience substantially the same, very small, changes due to changes in temperature. Further, these SAW resonators 19,20 can be configured to possess a substantially equivalent temperature coefficient. SAW resonators 19, 20, 21, however, are preferably arranged in parallel to one another.

Considering the orientation or mode in which the substrate 14 bends when pressure is exerted upon it, it is significant to note that sensor apparatus 10 can be configured to utilize one-dimensional supported beam bending of the die 14, rather than two-dimensional plate bending. One-dimensional supported beam bending is uniform in the transverse dimension and allows for the implementation of a device that deflects in a predictable, desired manner with a narrow transverse dimension, reducing the die size relative to devices utilizing plate-bending modes. Additionally, because the sides of the die 14 are unsupported, the maximum deflection of the one-dimensional bending motion caused by a given applied pressure can be greater than the maximum deflection for a plate of the same geometry supported on all four sides with the same applied pressure, allowing for an increase in sensitivity for a given die size.

The substrate 14 can be mounted in what is often referred to as a "flip-chip" orientation, wherein the substrate 14 possesses electrically conductive bumps 16 located on the resonator's bond pads 23 that require electrical connection. Not all "bumps" are required for electrical connection; some bumps 16' are used solely for mechanical support reasons. The die can be then "flipped" face down into the package, and an ultrasonic scrubbing motion can be utilized to bond the bumps 16,16' to substrate 14, depending upon design considerations.

The bumps 16,16' preferably can be formed as gold ball bumps, and the bond pads 23 may comprise various metals, typically gold on the package side and aluminum or a titanium- or copper-doped aluminum on the die 20 side. This mounting technique utilizes the bump bonds for mechanical attachment and support, and also utilizes certain of the bump bonds to form the electrical connection between the substrate 14 and the package. The device 10 then can possess internal electrical connections between bond pads 23 inside the well 12 and additional bond pads on the outside of the package 11, which can be attached to an antenna (e.g., see FIG. 3) or other electrical circuit using a desired technique.

Such a packaging technique is very rugged and easy to manufacture in high volume, although is not a limiting feature of the embodiments disclosed herein. As in standard ceramic packaging fabrication techniques known in the art, the electrical connections to the die 14 can pass from the interior to the exterior of the box 11 hermetically. In this embodiment, each lead thereof can be co-formed with the package 11 and can comprise a metal such as, for example, tungsten or gold, although these are not intended as limitations.

In order to measure pressure in the completed device 10, some reference pressure may be required at one side of the substrate 14. Such a feature can be achieved by hermetically sealing the device package 11 at a known pressure and in a desired atmosphere. This can be a vacuum, resulting in a device capable of measuring absolute pressure, or it can be some known pressure of a desired gas, such as, but not limited to, dry nitrogen.

A means for transmitting the external pressure to the substrate 14 within the hermetically sealed package 11,13 should be implemented in order for the device 10 to sense pressure properly. This transfer mechanism should not introduce losses; that is, it should be as direct and efficient as possible. In the accordance with one embodiment, the package 11, 13 can be designed so that, when the die 14 is attached within the package 11, 13 using, for example, flip-chip bonding techniques, the backside of the substrate 14 can be located just slightly below the upper edges of the package 11 sides.

The lid 13 can be then placed on the top of the package 11. The lid can be attached to the box 11 by a hermetic sealing process such as soldering or welding. Because the lid 13 is extremely thin, it is therefore very flexible and does not significantly reduce the amount of bending of the substrate 14 (a thicker lid may make the bending structure effectively thicker, resulting in reduced pressure sensitivity).

FIG. 3 illustrates an exemplary system 40 for use in measuring pressure and temperature in the interior of a vehicle's tire 41. The system 40 comprises the sensor 10 attached to an antenna 46, which can be positioned within at least one of the tires 41. Another antenna 42 can be positioned within the vehicle 43 for sending an output electromagnetic signal to and for receiving an input electromagnetic signal from the sensor antenna 46. The output signal can be generated by a signal generator 44 in the vehicle 43, with the output signal in a frequency range resonant with the three SAW sensing elements or SAW resonators 19–21.

A signal processor 44 located within the vehicle 43 can be utilized to translate the input electromagnetic signal 47 received by the antenna 42 into an internal tire pressure value and an internal tire temperature value. The processor 44 is in electrical communication with an occupant-accessible readout 45 for displaying the pressure value and the temperature value inside the tire 41 within the vehicle 43.

Figure 4:
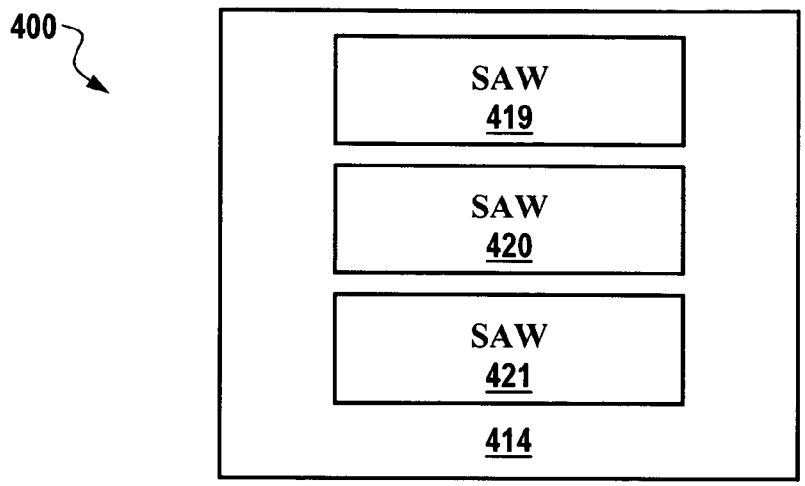
FIG. 4 illustrates a block diagram of a sensor apparatus, which can be implemented in accordance with a preferred embodiment.

FIG. 4 illustrates a block diagram of a sensor apparatus 400, which can be implemented in accordance with a preferred embodiment. Sensor apparatus 400 is generally composed of multiple sense elements or SAW resonators 419, 420 and 421 that react to different frequencies thereby allowing sensor apparatus 400 function internationally. Sensor apparatus 400 can function as a wireless sensor, which includes substrate 414 upon which the wireless sensor is configured. The wireless sensor or sensor apparatus 400 includes a plurality of surface acoustic wave sensing elements 419, 420, 421 configured upon the substrate 414, wherein one or more of the plurality of surface acoustic wave sensing elements 419, 420, 421 is responsive to a wireless frequency range that differs from that of a wireless frequency range of at least one other surface acoustic wave sensing elements 419, 420, 421 among the plurality of surface acoustic wave sensing elements 419, 420, 421 in order to permit a wireless interrogation of the sensor apparatus 400 despite varying international frequency standards thereof.

Each of the surface acoustic wave sensing elements 419, 420, 421 can be located in parallel with one another upon the substrate 414. Sensor apparatus 414 can function as a pressure sensor functioning in a delay mode, such that the plurality of surface acoustic wave sensing elements 419, 420, 421 detects pressure based on a strain applied to the plurality of surface acoustic wave sensing elements. Each of the plurality of surface acoustic wave sensing elements 419, 420, 421 receives an equivalent amount of strain when pressure is applied to the plurality of surface acoustic wave sensing elements 419, 420, 421.

Sensor apparatus 400 is similar to the sensor apparatus 10 described earlier, but differs from this device in that sensor apparatus 400 includes parallel sensing elements or SAW resonators 419, 420, 421. It is this parallelism that permits all three SAW resonators 419, 420, 421 to receive the same strain when pressure is applied to the sensor apparatus 400. In doing so, sensor apparatus 400 provides the capability for three separate interrogators to measure the strain. At any one location, however, only one style of interrogators will be employed, rendering two of the three SAW resonators 419, 420, 421 useless, but not interfering with the one useful resonator. Although three SAW resonators 419, 420, 421 are illustrated in FIG. 4, it can be appreciated that more than three SAW resonators can also be implemented in accordance with alternative embodiments. Similarly, only two SAW resonators may also be implemented, depending upon design considerations.

Figure 5:
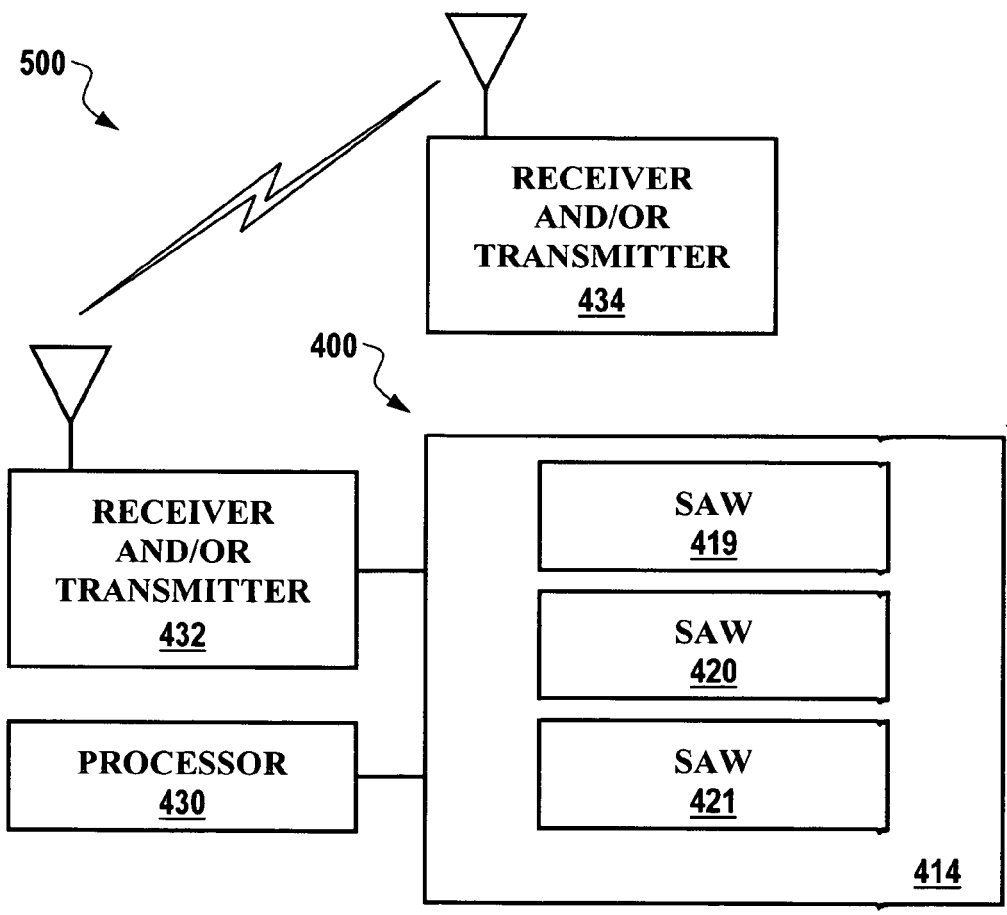
FIG. 5 illustrates a block diagram of a sensor system, which can be implemented in accordance with a preferred embodiment.

FIG. 5 illustrates a block diagram of a sensor system 500, which can be implemented in accordance with a preferred embodiment. Note that in FIGS. 4–5, identical or similar parts are indicated generally by identical reference numerals. System 500 therefore includes sensor apparatus 400. In this case, however, a transmitter and/or receiver 432 is generally associated with sensor apparatus 400 and by way of extension, the surface acoustic wave sensing elements or SAW resonators 419, 420, and 421. The transmitter and/or receiver 432 can transmit and/or receive data and instructions from transmitter and/or receiver 434, which is located external to sensor apparatus 400. A processor 430 can also be associated with sensor apparatus 400 and can process instructions transmitted by transmitter and/or receiver 434 to transmitter and/or receiver 432.

In system 500, one or more of the SAW resonators 419, 420, and 421 is responsive to a wireless frequency range that differs from that of a wireless frequency range of at least one other SAW resonator among the group of resonators 419, 420, and 421 in order to permit a wireless interrogation of the wireless sensor apparatus 400 despite varying international frequency standards thereof.

Processor 430 can be implemented as a microprocessor, i.e., a silicon chip than contains a CPU (Central Processing Unit), Processor 430 can control functions of system 500 and/or sensor apparatus 400. Such functions include logical processing of instructions and the control and timing of sensing operations performed by sensor apparatus 400. Note that as utilized herein, the term "processor" and "microprocessor" can be utilized interchangeably to refer to the same device. A typical microprocessor, for example, can be formed in the context of a silicon chip that contains the CPU.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

What is claimed is:

1. A sensor apparatus, comprising:
   a wireless sensor comprising a plurality of surface acoustic wave sensing elements, wherein each of said plurality of surface acoustic wave sensing elements is responsive to a wireless frequency range that differs from that of a wireless frequency range of the other surface acoustic wave sensing elements among said plurality of surface acoustic wave sensing elements in order to permit a wireless interrogation of said wireless sensor despite varying frequency standards thereof;
   wherein the wireless sensor is configured to select one of the plurality of surface wave sensing elements based on a geographical location in which the sensor is employed; and
   wherein the wireless sensor is further configured to interrogate only the selected surface wave sensing element.

2. The apparatus of claim 1 wherein each of said plurality of surface acoustic wave sensing elements are located in parallel with one another upon a substrate.

3. The apparatus of claim 2 wherein at least one of said plurality of surface acoustic wave sensing elements comprises a surface acoustic wave resonator.

4. The apparatus of claim 2 wherein said wireless sensor comprises a pressure sensor, wherein said plurality of surface acoustic wave sensing elements detect pressure based on a strain applied to said plurality of surface acoustic wave sensing elements.

5. The apparatus of claim 4 wherein each of said plurality of surface acoustic wave sensing elements receives an equivalent amount of strain when pressure is applied to said plurality of surface acoustic wave sensing elements.

6. The apparatus of claim 1 wherein said plurality of surface acoustic wave sensing elements comprise at least two surface acoustic wave sensing elements.

7. The apparatus of claim 1 wherein said plurality of surface acoustic wave sensing elements comprise at least three surface acoustic wave sensing elements.

8. The apparatus of claim 1 wherein said wireless sensor measures pressure in a delay mode.

9. A surface acoustic wave sensing system, comprising:
   a substrate upon which a wireless sensor is configured;
   a wireless sensor comprising a plurality of surface acoustic wave sensing elements configured upon said substrate;
   a transmitter for transmitting wireless data to said plurality of surface acoustic wave sensing elements, wherein each of said plurality of surface acoustic wave sensing elements is responsive to a wireless frequency range that differs from that of a wireless frequency range of the other surface acoustic wave sensing elements among said plurality of surface acoustic wave sensing elements in order to permit a wireless interrogation of said wireless sensor despite varying frequency standards thereof;
   wherein the wireless sensor is configured to select one of the plurality of surface wave sensing elements based on a geographical location in which the sensor is employed; and
   wherein the wireless sensor is further configured to interrogate only the selected surface wave sensing element.

10. The system of claim 9 further comprising:
    a transmitter associated with said plurality of surface acoustic wave sensing elements, such that said transmitter sends data to a receiver located external to said wireless sensor.

11. The system of claim 9 further comprising:
    a receiver associated with said plurality of surface acoustic wave sensing elements, wherein said receiver receives data transmitted from said transmitter; and
    a processor associated with said plurality of surface acoustic wave sensing elements, wherein said processor instructs said plurality of surface acoustic wave sensing elements to perform sensing functions based on data transmitted to said receiver from said transmitter.

12. The system of claim 9 further comprising a processor associated with said wireless sensor, wherein said processor instructs said wireless sensor to function according to data transmitted from said transmitter, wherein said transmitter is located external to said wireless sensor.

13. The system of claim 9 wherein each of said plurality of surface acoustic wave sensing elements are located in parallel with one another upon said substrate and wherein at least one of said plurality of surface acoustic wave sensing elements comprises a surface acoustic wave resonator.

14. The apparatus of claim 13 further comprising:
    wherein said wireless sensor comprises a pressure sensor, wherein said plurality of surface acoustic wave sensing elements detect pressure based on a strain applied to said plurality of surface acoustic wave sensing elements; and
    wherein each of said plurality of surface acoustic wave sensing elements receives an equivalent amount of strain when pressure is applied to said plurality of surface acoustic wave sensing elements.

15. A sensor method, comprising the steps of:
    forming a wireless sensor upon a substrate; and
    configuring said wireless sensor to comprise a plurality of surface acoustic wave sensing elements located upon said substrate, wherein each of said plurality of surface acoustic wave sensing elements is responsive to a wireless frequency range that differs from that of a wireless frequency range of the other surface acoustic wave sensing elements among said plurality of surface acoustic wave sensing elements in order to permit a wireless interrogation of said wireless sensor despite varying frequency standards thereof;
    further configuring said wireless sensor to select one of the plurality of surface wave sensing elements based on a geographical location in which the sensor is employed; and further configuring said wireless sensor to interrogate only the selected surface wave sensing element.

16. The method of claim 15 further comprising the step of: locating each of said plurality of surface acoustic wave sensing elements in parallel with one another upon said substrate.

17. The method of claim 15 further comprising the step of configuring at least one of said plurality of surface acoustic wave sensing elements to comprise a surface acoustic wave resonator.

18. The method of claim 15 further comprising the step of configuring said wireless sensor to comprise a pressure sensor, wherein said plurality of surface acoustic wave sensing elements detect pressure based on a strain applied to said plurality of surface acoustic wave sensing elements.

19. The method of claim 18 wherein each of said plurality of surface acoustic wave sensing elements receives an equivalent amount of strain when pressure is applied to said plurality of surface acoustic wave sensing elements.

20. The method of claim 18 wherein said wireless sensor measures pressure in a delay mode.

* * * * *